United States Patent [19]

Kida

[11] 3,915,199

[45] Oct. 28, 1975

[54] APPARATUS FOR MEASURING THE INSERTING LENGTH OF A PLURALITY OF WEFTS IN A SHUTTLELESS LOOM

[75] Inventor: Kazuyoshi Kida, Komatsu, Japan

[73] Assignee: Teijin Ltd., Osaka, Japan

[22] Filed: Aug. 8, 1973

[21] Appl. No.: 386,624

[30] Foreign Application Priority Data

Aug. 10, 1972 Japan.............................. 47-79438
Aug. 10, 1972 Japan......................... 47-93309[U]
Aug. 10, 1972 Japan......................... 47-93311[U]
Aug. 10, 1972 Japan......................... 47-93310[U]

[52] U.S. Cl............................................ 139/122 R
[51] Int. Cl.$^2$......................................... D03D 47/34
[58] Field of Search....... 139/122 R, 122 W, 127 R, 139/127 P; 66/132; 226/97

[56] References Cited
UNITED STATES PATENTS

| | | | |
|---|---|---|---|
| 3,140,633 | 7/1964 | Vincent .............................. | 139/127 |
| 3,303,857 | 2/1967 | Scheffel ............................. | 139/122 |
| 3,833,028 | 9/1974 | Chattaway et al. ................. | 139/122 |

FOREIGN PATENTS OR APPLICATIONS

| 2,016,184 | 10/1971 | Germany ............................ | 139/122 |
|---|---|---|---|

Primary Examiner—Henry S. Jaudon
Attorney, Agent, or Firm—Sherman & Shalloway

[57] ABSTRACT

An apparatus for measuring the inserting lengths of a plurality of different kinds of wefts in a shuttleless loom which comprises contacting or retracting measuring rollers with or from a measuring drum to withdraw a plurality of wefts from supply packages outside the loom and delivering the wefts to storing devices or stopping them, wherein the measuring rollers are rotated at the same peripheral speeds as that of the measuring roller even while these measuring rollers are spaced from the measuring drum, thereby to render the delivery length of the wefts equal to the product of the peripheral speed of the measuring drum and by the contacting time of the measuring rollers. If desired, the wefts are gripped on the weft supply package side of the measuring drum when the measuring roller departs from the measuring drum to stop the withdrawing of the weft. The retracting and contacting actions of the mearasuring rollers may be transmitted to the supporting arms for the measuring rollers through a single transmission mechanism.

8 Claims, 10 Drawing Figures

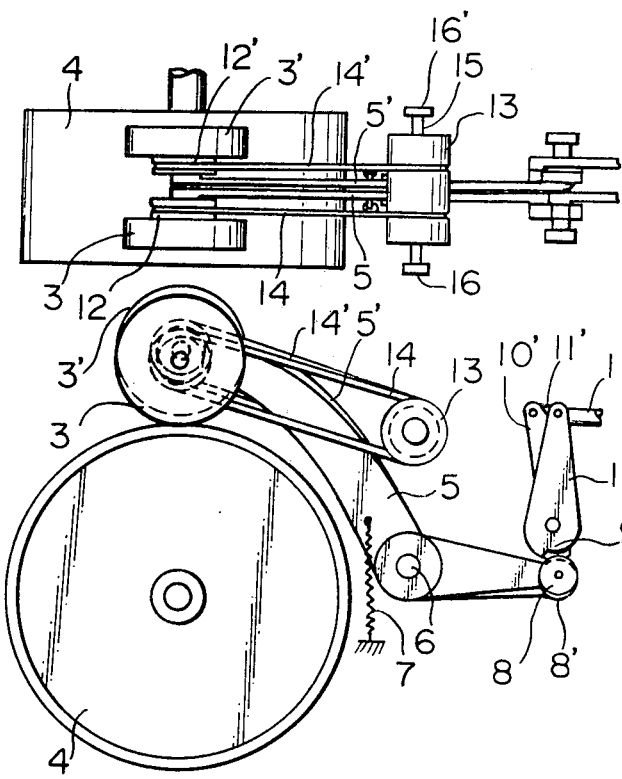
Fig. 5
Fig. 6
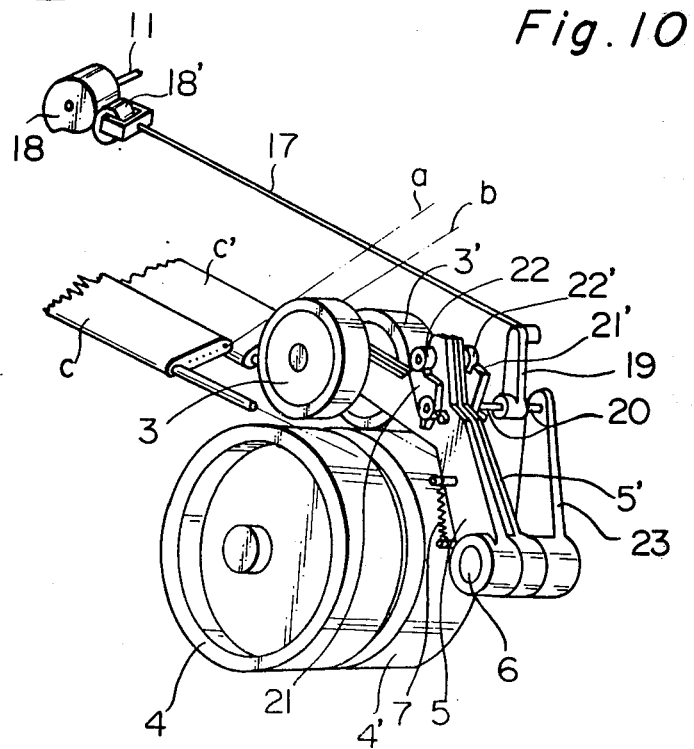
Fig. 10

APPARATUS FOR MEASURING THE INSERTING LENGTH OF A PLURALITY OF WEFTS IN A SHUTTLELESS LOOM

BACKGROUND OF THE INVENTION

1. Field of the Invention

This invention relates to an apparatus for measuring the inserting lengths of a plurality of different kinds of wefts when these wefts are selectively withdrawn from supply packages outside a shuttleless loom.

2. Technical Considerations and Prior Art

According to the conventional method of measuring the inserting lengths of wefts, the circumferential surface of a drum continuously rotating at a constant speed is generally used for length measurement. This drum will be referred to as a measuring drum. A weft is placed on the circumferential surface of the drum, and another roller urges the weft against the drum surface. This roller will be referred to as a measuring roller. At this time, the roller is adapted to be freely rotatable. In other words, when it comes in contact with the measuring drum, it rotates, and when it retracts from it, the speed of rotation decreases due to frictional resistance. While being held by the surfaces of both rotating bodies, the weft is being delivered at the peripheral speeds of both rotating bodies. Under the above-described conditions, the measuring length of the weft to be inserted is roughly determined by the product of the peripheral speed of the measuring drum and by the time required for contact with the measuring roller. The above-mentioned measuring method has previously been in use, but found to have certain defects. For example, in the case of a single weft, the length measurement is performed successively at a certain time interval, and the contacting and retracting of the measuring roller with and from the measuring drum are repeated. During this time, the measuring roller continues to rotate by inertia, and the rotating speed does not change much. However, when a woven fabric is to be produced using a plurality of wefts, the weft inserting operation generally becomes complicated, and results in various troubles. Only by eliminating these troubles can woven fabrics of superior quality which sufficiently exhibit the effects of using a plurality of wefts be produced. By using a plurality of wefts, woven fabrics of complicated textures can be produced which are unlike those produced by mere alternate weft insertion. However, when the texture of the woven fabric becomes complicated than alternate weft insertion, the time interval of weft insertion differs from weft to weft. Specifically, the conventional methods of inserting a plurality of wefts results in the following problems.

A. In the method of measuring the inserting lengths of a plurality of wefts, the time during which weft delivery is stopped and as a result, retracting the measuring roller from the measuring drum is not constant, but is far longer than when inserting a single weft. Thus, the peripheral speed of measuring roller is far less than the peripheral speed of the measuring drum when the measuring roller is urged against the surface of the measuring drum. As a result of contact, the measuring roller is accelerated, and its peripheral speed becomes equal to that of the measuring drum. Because of a time lag between the time of initiation of length measurement and the time at which the peripheral speed of the measuring roller becomes constant as a result of acceleration, the delivery length of the weft becomes shorter than the product of the peripheral speed of the measuring drum and the time required for contact of the measuring roller with the measuring drum. The degree of length shortening is dominated by the rotating speed of the measuring roller at the time of initiation of length measurement. It varies according to the time during which the measuring roller is detached from the measuring drum, and the rotational friction of the measuring roller. Accordingly, when the measuring time is not constant and is longer, non-uniformity occurs in length measurement.

Thus, when woven fabrics of complicated textures are prepared by such conventional methods, weaving defects are caused, the weaving efficiency is extremely reduced, and waste wefts increase. This is because of non-uniformity in length measurement, therefore utilization of conventional methods are not practical.

B. The non-uniformity in length measurement mentioned above occurs also when the measuring roller is retracted from the measuring drum and length measurement is stopped. This is caused by the overrunning of the weft due to inertia. This also becomes a cause of trouble when producing woven fabrics of complicated textures.

C. When a system for controlling the retracting and contacting motions of the measuring roller is used for every measuring roller in measuring the inserting lengths of a plurality of wefts, the structure of the apparatus becomes complicated and even slight allowances in each joint part affect the accuracy of length measurement, which leads to non-uniformity in length measurement.

According to the conventional method, when alternate weft insertion is performed using a plurality of wefts in which the insertion time interval is equal, the size deficiency of each weft as measured is almost the same for all the wefts. Thus, the desired length measurement is performed by increasing the contact time slightly to to regulate the lengths.

SUMMARY OF THE INVENTION

It is an object of this invention to provide a method not having the above-described defects when used in weaving fabrics of complicated textures using a plurality of wefts on a shuttleless loom, in which even when a plurality of wefts are inserted according to a program suited for a particular woven fabric texture, accurate length measurement can be performed at all times; that is to say, in which the supply of a weft from a package is performed at a constant speed, and the stopping of supply is performed instantaneously and completely, and if desired, the feeding of a plurality of wefts is changed simply and assuredly through a single system.

The following effects have been obtained by making these improvements. Firstly, the characteristic feature of using a plurality of wefts is sufficiently exhibited, and the texture of the woven fabric can be varied over a wide range. Accordingly, the texture varies with wefts. To form a weft, a plurality of wefts of the same yarn or of different yarn may be used. When using a different yarn, the yarn may differ in size, twisting method, turns of twist, color or yarn properties. The length measurement becomes accurate, and defects in woven fabrics caused by the excessiveness or deficient weft inserting length are obviated. In addition troubles such as the stopping of loom operation are avoided, and the quantity of weft waste is reduced.

The outline of the apparatus of this invention is as follows:

A plurality of rotatable measuring rollers are detachably secured to a single measuring drum. When each measuring roller comes into contact with the drum and is in a rotary state, the other measuring roller is left away from the drum, but is caused to maintain a given rotation. Wefts fed below the measuring rollers are each delivered when the drum contacts a roller and the roller rotates. The length of the delivered weft equals the product of the peripheral speed of the measuring drum and the time required for contact of the drum with the roller. On retracting the measuring roller from the drum, the drawing of the weft from a package is stopped. The support arms of the individual rollers each carry out the retracting and contacting of the aforesaid measuring roller.

BRIEF DESCRIPTION OF THE DRAWINGS

The drawings illustrate the embodiments of the method of this invention in which:

FIG. 5 is a plan of a third embodiment of this invention with regard to measuring rollers;

FIG. 6 is a side elevation of the third embodiment;

FIG. 10 is a perspective view of an embodiment of this invention relating to a control system for the retracting and contacting of measuring rollers from and with a measuring drum.

DETAILED DESCRIPTION OF THE PREFERRED EMBODIMENTS

Figure 1:
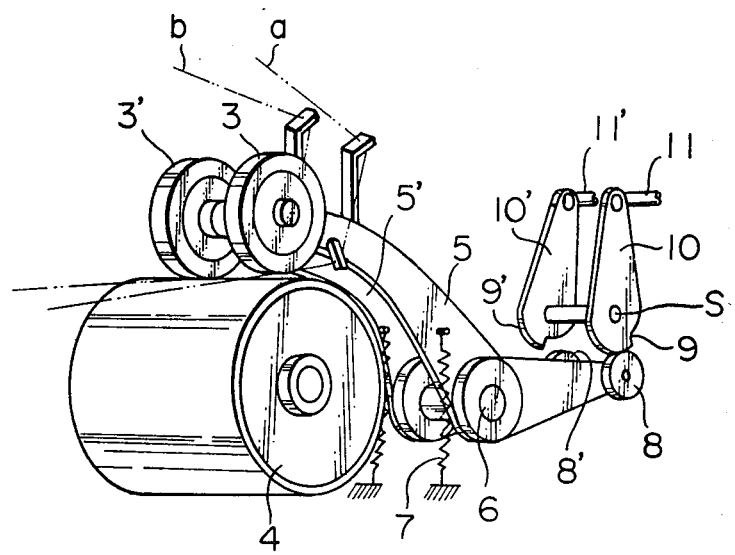
FIG. 1 is a perspective view of a first embodiment of this invention in regard to measuring rollers.

Referring to FIG. 1, the general construction of the invention will be described. Two wefts $a$ and $b$ withdrawn from a supply source are fed to a measuring drum via guides. The measuring drum 4 rotates synchronously with the rotation of the loom (not shown). Measuring rollers 3 and 3' are rotatably secured to support arms 5 and 5' having a fulcrum 6. Springs 7 and 7' are fitted respectively to the arms to urge the measuring rollers against the surface of the measuring drum 4, subject to the following restriction. Rollers 8 and 8' are rotatably fixed to the other ends of the arms 5 and 5' on the side opposite to the fulcrum, and above the rollers, there are levers 10 and 10' having which push down the roller 8 and 8' which levers oscillate about a support shaft S. At the lower ends of the levers 10 and 10', cams 9 and 9' having raised and depressed portions are formed, and rods 11 and 11' are secured rotatably to the other ends of the levers 10 and 10'. The other ends of the rods 11 and 11' are connected to a change mechanism of the loom. For example, when the raised portion of the cam 9 pushes down the roller 8, the measuring roller 3 on the forward end of the arm 5 is lifted, and retracted from the surface of the measuring drum 4. When the depressed portion of the cam 9 reaches the position of the roller 8, the measuring roller 3 is pulled by the spring 7 and urged against the surface of the measuring drum 4. Therefore, the measuring rollers 3 and 3' are not always urged against the surface of the measuring drum, but, by the oscillation of the levers 10 and 10', they are urged against, and retracted from, the measuring drum 4 almost alternatively. This operation is performed by the change mechanism of the loom. When one of the measuring rollers 3 and 3' comes in contact with the surface of the measuring drum 4 in the state of holding the weft, the held weft is delivered to storing devices. If the measuring rollers are of the conventional type which is independently rotatable, it takes time for the measuring roller to contact the measuring drum and have the same peripheral speed as that of the measuring drum. Therefore, the delivery length of the weft is not determined by the product of the circumferential speed of the measuring drum 4 and the time required for contacting, but is shorter.

Hence, in the present invention, the measuring roller retracted from the measuring drum is maintained at the same speed as the speed of the measuring roller performing length measurement.

Figure 2:
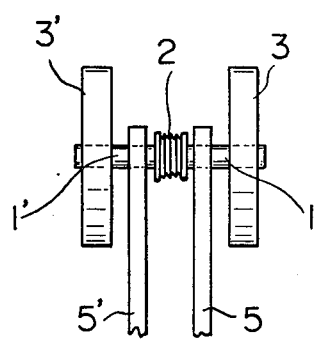
FIG. 2 is a detailed view of the measuring rollers shown in FIG. 1.

As is shown in FIG. 2, shafts 1 and 1' secured respectively to the measuring rollers 3 and 3' are rotatably supported by the arms 5 and 5', and the approaching ends of the shafts 1 and 1' are connected by a flexible joint 2 using a coil spring. The connection of the shafts 1 and 1' is not limited to the example shown in FIG. 2, but other joints such as a rubber flexible joint or universal joint can also be employed. If in FIG. 1 the measuring roller 3' is urged against the surface of the measuring drum and the measuring roller 3 is retracted from the measuring drum 4, the former rotates at the same speed as that of the measuring drum 4, and since shafts 1 and 1' are connected by the joint 2, the latter rotates at the same speed. Accordingly, when the latter roller is urged against the measuring drum, the desired length measurement can be made since the peripheral speed of the latter roller is equal to that of the measuring drum.

Figure 3:
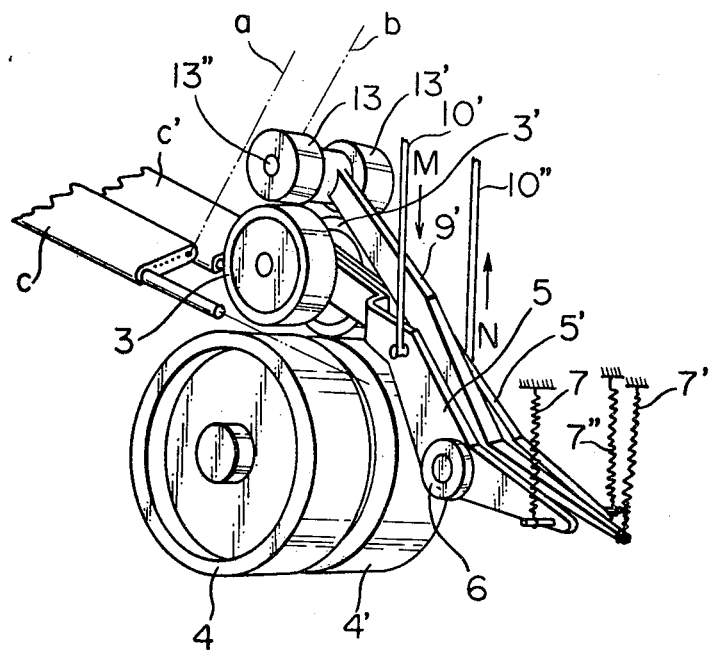
FIG. 3 is a perspective view of a second embodiment of this invention in regard to measuring rollers.
Figure 4:
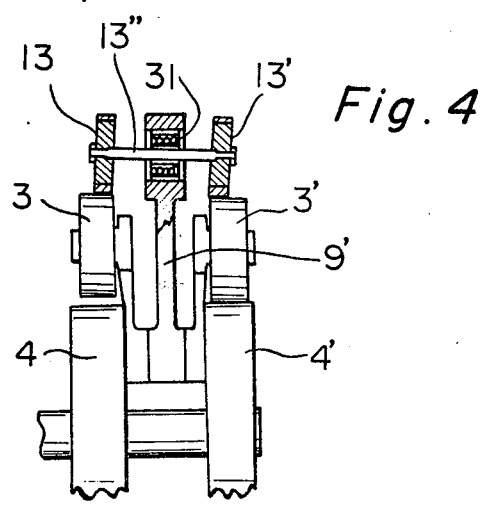
FIG. 4 is a detailed view of the measuring rollers shown in FIG. 3.

Referring to FIGS. 3 and 4 which show another embodiment wherein the rotations of measuring rollers are maintained always constant, a shaft 13'' is rotatably and inclinably fixed to the forward end of the arm 9. To both end portions of the shaft 13'', transmission rollers 13 and 13' are fitted integrally. The transmission rollers 13 and 13' at the forward end of the arm 9' are always urged against the measuring rollers 3 and 3' by means of the spring 7'. When it is desired to measure the length of weft $a$ by the apparatus of this invention, the rod 10' interlocked with the change mechanism of the loom is pushed down in the direction of arrow M, and the rod 10'' is lifted in the direction of arrow N. (FIG. 3 shows the state of measuring the length of weft $b$.) As a result, the measuring roller 3' releases weft $b$ and stops measuring its length, and the other measuring roller 3 holds the weft $a$ between it and the measuring drum 4 and begins to measure its length. Even during this length measurement, the measuring roller 3' away from the drum rotates at the same speed as the other measuring roller 3 through the transmission rollers 13 and 13'.

FIG. 3 also shows storing devices c and c' for wefts, and FIG. 4 shows the state of inclination of the central axis 13 of the transmission rollers 13 and 13'.

Still another embodiment of the present invention is shown in FIGS. 5 and 6.

Pulleys 12 and 12' are provided on the side surfaces of measuring rollers 3 and 3'. Stretchable belts 14 and 14' are hung between these pulleys 12 and 12' and a transmission roller 13. A shaft 15 of the transmission roller 13'' is maintained in a rotatable state by bearings 16 and 16'. The operation of the above mechanism is as follows: For example, when the measuring roller 3 is urged against the surface of the measuring drum 4, the roller 3 rotates at the same peripheral speed as the measuring drum. This rotation is transmitted to the transmission roller 13'' through the belt 14, and then to the pulley 12' through the belt 14'. Thus, the measuring roller 3' can rotate at the same speed as the measuring roller 3. Thus, the measuring rollers 3 and 3' at the initiation of length measurement are always in the normally rotating state or near it, and the delivery length of the measured weft is not shorter.

In the embodiments shown in FIGS. 1 to 6, the measuring roller away from the measuring drum rotates at the same peripheral speed as the peripheral speed of the measuring drum. However, the invention is not limited to these embodiments. An apparatus of the invention is characterized in that a plurality of freely rotatable measuring rollers are disposed such that they are capable of engaging with at least one or more measuring drums, each drum being disposed coaxially with the other while any one of the measuring rollers is measuring the weft length by being rotated through its engagement with the drum; the remaining measuring rollers are allowed to keep the same rotation by the rotary force of the measuring roller engaged with the measuring drum.

Figure 7:
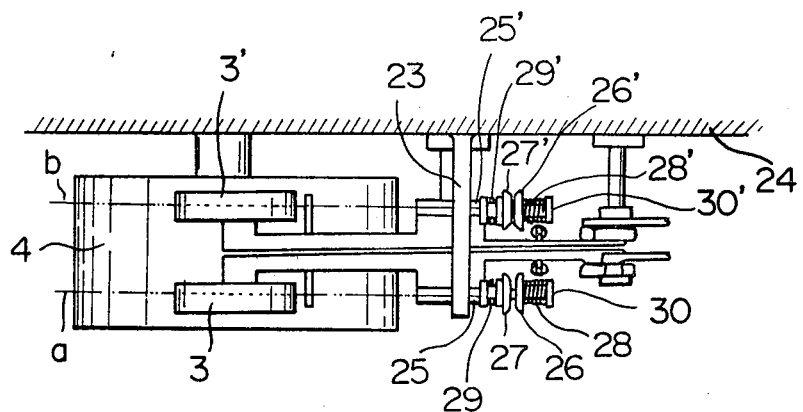
FIG. 7 is a plan of an embodiment of this invention concerning the supply stoppage of wefts.
Figure 8:
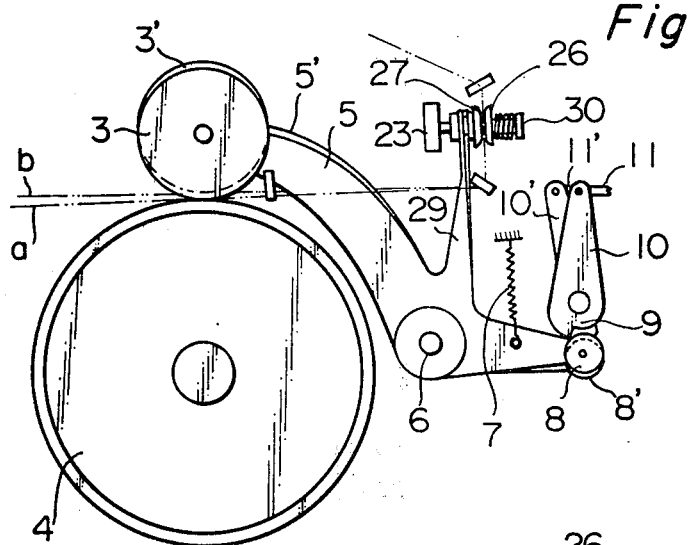
FIG. 8 is a side elevation of the embodiment shown in FIG. 7.
Figure 9:
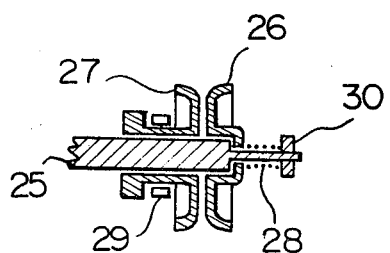
FIG. 9 is a detailed view of the gripping portion of the embodiment of FIG. 7.

Embodiments relating to the stopping of the delivery of the weft are shown in FIGS. 7, 8 and 9. As already mentioned, when length measurement is stopped by retracting the measuring roller from the surface of the measuring drum, the weft sometimes overruns by its inertia. At this time, the measured length of the weft becomes somewhat longer. Also because the measured weft is stored on an air stream, the weft is withdrawn a little by the force of the air stream, and the measured length becomes somewhat longer. In order to remove these defects, the weft is gripped and stopped completely as soon as the measuring roller departs from the surface of the measuring drum and releases the weft. The apparatus, as shown in FIGS. 7, 8 and 9, consists mainly of measuring rollers 3 and 3', measuring drum 4, arms 5 and 5', fulcrum 6 therefor, springs 7 and 7', cams 9 and 9', levers 10 and 10', and rods 11 and 11'. Additionally, this apparatus includes a device which always maintains the peripheral speeds of the measuring rollers constant, as shown in FIGS. 1 to 6. This measuring apparatus includes a weft gripping device which stops the wefts consisting of a supporting rod 23 fixed to a frame 24 above the arms 5 and 5', pins 25 and 25' supported by the rod 23, gripping washers 26 and 26' and 27 and 27' secured to the pins 25 and 25'. The washers are urged in the direction of the pin axes by springs 28 and 28' provided at the forward ends of the pins 25 and 25', and on the other hand, the washers 27 and 27' are supported by assisting arms 29 and 29' provided above the fulcrum 6 of the arms 5 and 5'. In the drawings, collars 30 and 30' for adjusting the pressure of the springs 28 and 28' are shown. Wefts a and b delivered from a supply source are moved towards the measuring drum 4 passing between the washers 26 and 27 and between the washers 26' and 27'. The gripping operation will be described with reference to the arm 5. When the arm 5 rotates counterclockwise according to the change mechanism of the loom, that is to say, when the length measurement of the weft a is performed by urging the measuring roller 3 against the surface of the measuring drum 4, the assisting arm 29 fixed to the arm 5 also moves in the same direction. At this time, the washer 27 is retracted from the washer 26, and the weft a can pass freely. On the contrary, when the measuring roller 3 rotates clockwise and departs from the surface of the measuring drum 4, the washer 27 is urged against the washer 26 by the movement of the above assisting arm 29 to prevent the free passage of the weft. The gripping device described above makes it possible to interrupt and resume the length measurement of the weft more accurately.

FIG. 10 shows a single control system for transmitting the operation of the measuring rollers. This will be described by comparing FIGS. 1 and 10. Referring to FIG. 1, a system for controlling the retracting and contacting of the measuring roller from and with the measuring drum is provided for each measuring roller. For example, the operation is transmitted from the rod 11 connected with the change mechanism of the loom to the ball 8, fulcrum 6, and arm 5 via the lever 10 and cam 9, and finally to the measuring roller 3. There is another system for transmitting the operation from the rod 11' to the measuring roller 3'. On the other hand, in FIG. 10, one rod can perform length measurement at two places. The construction shown in FIG. 10 includes a cam 18 rotating by the rod 11 connected to the change mechanism and a follower roller 18' in contact with the cam 18. The movement of the roller 18' causes cams 21 and 21' to rotate after being transmitted by a rod 17, a crank composed of a lever 19 and a shaft 20. The cams 21 and 21' are secured adjustably to the shaft 20 so as to set up the timing of the surfaces of the above cams 21 and 21' to come in contact with rollers 22 and 22' of the arms 5 and 5'. By the raised and depressed portions of the cams 21 and 21', the measuring rollers 3 and 3' make contact with, or retract from, the measuring drums 4 and 4'. The wefts whose lengths have been measured by contact with the measuring roller are stored for a while in storing boxes c and c'. The measuring drums 4 and 4' shown in FIG. 10 are coaxial with each other, and rotate synchronously with the rotation of the loom by being secured to a part of the rotating shaft of the loom.

While the invention has been described with particular reference to the embodiments shown in the drawings, it should be understood that various changes and modifications are possible within the spirit and scope of this invention.

What is claimed is:

1. An apparatus for measuring the insertion lengths of wefts of different types inserted into a shuttleless loom, wherein said apparatus comprises:
   at least one rotating measuring drum;
   a plurality of measuring rollers mounted on shafts wherein at least one measuring roller is provided for each type of weft;

individual arm means supporting each roller adjacent to said measuring drum;

means for bringing said rollers selectively and individually into engagement with said measuring drum to advance the associated weft between the roller and drum while measuring the lengths of said weft; and flexible means for coupling the shafts on which the rollers are mounted wherein the rollers out of engagement with the drum are coupled to the roller in engagement with the drum to rotate the rollers out of engagement at the same peripheral speed as the roller in engagement.

2. The apparatus of claim 1 wherein said coupling means includes endless transmission means entrained to drive each roller from a common shaft.

3. The apparatus of claim 2, wherein the endless transmission means includes a pulley secured to rotate with each roller and an endless belt connecting each pulley to the common shaft.

4. The apparatus of claim 1 further including means for causing a subsequent roller to engage the drum and advance a subsequent weft when each roller retracts away from the drum after having advanced a weft.

5. The apparatus of claim 1, wherein the means for bringing the rollers into engagement with the drum are arms and wherein a single transmitting mechanism operates the arms to engage the rollers with the drum.

6. The apparatus of claim 5, wherein the means for engaging and disengaging the rollers with the drum includes:

a cam rotated in accordance with a change mechanism of a loom;

a rod reciprocated by said cam; and a crank reciprocated by said rod to raise and lower arms upon which the rollers are mounted via cams attached to the cranks that engage followers on the arms.

7. The apparatus of claim 2, wherein the means for bringing the rollers into engagement with the drum are arms and wherein a single transmitting mechanism operates the arms to engage the rollers with the drum.

8. An apparatus for measuring the insertion lengths of wefts of different types inserted into a shuttleless loom, wherein said apparatus comprises:

at least one rotating measuring drum;

a plurality of measuring rollers wherein at least one measuring roller is provided for each type of weft;

individual arm means supporting each roller adjacent to said measuring drum;

means for bringing said rollers selectively and individually into engagement with said measuring drum to advance the associated weft between the roller and drum while measuring the lengths of said weft; and means for coupling the rollers out of engagement with the drum to the roller in engagement with the drum to rotate the rollers out of engagement at the same peripheral speed as the roller in engagement, wherein said coupling means includes tiltable drive rollers which remain in engagement with the measuring rollers to rotate the measuring roller out of engagement with the drum at the same speed as the measuring roller in engagement with the drum.

* * * * *